US007185236B1

(12) United States Patent
Moser et al.

(10) Patent No.: US 7,185,236 B1
(45) Date of Patent: Feb. 27, 2007

(54) CONSISTENT GROUP MEMBERSHIP FOR SEMI-ACTIVE AND PASSIVE REPLICATION

(75) Inventors: Louise E. Moser, Santa Barbara, CA (US); Peter M. Melliar-Smith, Santa Barbara, CA (US)

(73) Assignee: Eternal Systems, Inc., San Jose, CA (US)

( * ) Notice: Subject to any disclaimer, the term of this patent is extended or adjusted under 35 U.S.C. 154(b) by 545 days.

(21) Appl. No.: 10/651,755

(22) Filed: Aug. 30, 2003

Related U.S. Application Data

(60) Provisional application No. 60/407,586, filed on Aug. 30, 2002.

(51) Int. Cl.
  *G06F 11/00* (2006.01)
(52) U.S. Cl. ............................. 714/47; 714/4; 714/10; 714/11; 714/113; 709/209
(58) Field of Classification Search ................ 714/4, 714/10, 11, 13; 709/209
  See application file for complete search history.

(56) References Cited

U.S. PATENT DOCUMENTS

| 5,696,896 A | * | 12/1997 | Badovinatz et al. | ........... 714/4 |
| 5,926,619 A | * | 7/1999 | Badovinatz et al. | ........... 714/4 |
| 6,839,752 B1 | * | 1/2005 | Miller et al. | ................ 709/224 |

* cited by examiner

*Primary Examiner*—Robert Beausoliel
*Assistant Examiner*—Charles Ehne
(74) *Attorney, Agent, or Firm*—John P. O'Banion

(57) ABSTRACT

This invention defines a method and mechanisms for maintaining a consistent group membership, based on the leader-follower strategy of Semi-Active or Passive replication. Each member of the group is assigned a rank, and a precedence, determined by the order in which it is added to the group. The Primary maintains the membership of the group, while each Backup monitors the behavior of the Primary. When a Backup detects that the Primary is faulty, the Backup announces that it is the new Primary and removes the faulty Primary from the membership of the group. The group membership algorithm disclosed here does not require a consensus decision to reconfigure the membership and effects a membership change more quickly in the common case where the Backup of lowest rank takes control as the new Primary when it determines that the existing Primary failed.

48 Claims, 9 Drawing Sheets

CONSISTENT GROUP MEMBERSHIP FOR SEMI-ACTIVE AND PASSIVE REPLICATION

CROSS-REFERENCE TO RELATED APPLICATIONS

This application claims priority from U.S. provisional application Ser. No. 60/407,586 filed on Aug. 30, 2002, incorporated herein by reference.

STATEMENT REGARDING FEDERALLY SPONSORED RESEARCH OR DEVELOPMENT

This invention was made with Government support under Grant No. 70NANBOH3015, awarded by the US Department of Commerce National Institute of Standards & Technology. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the public file or record of the United States Patent and Trademark Office, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention relates generally to fault-tolerant computer systems based on semi-active or passive replication and, more specifically, to the problem of maintaining a consistent group membership when the members of the group are subject to failure.

2. Incorporation by Reference

The following patents and publications are incorporated herein by reference:

PATENTS

U.S. Pat. No. 5,696,896
U.S. Pat. No. 5,699,501
U.S. Pat. No. 5,704,032
U.S. Pat. No. 5,787,249
U.S. Pat. No. 5,787,250
U.S. Pat. No. 5,793,962
U.S. Pat. No. 5,923,831
U.S. Pat. No. 5,999,712

PUBLICATIONS

H. Kopetz, G. Grunsteidl and J. Reisinger, Fault-tolerant membership service in a distributed real-time system, Proceedings of the International Conference on Dependable Computing for Critical Applications, Santa Barbara, Calif., August 1989, pp. 167–174.

P. D. Ezhilchelvan, and R. de Lemos, A robust group membership algorithm for distributed real-time systems, Proceedings of the IEEE Real-Time Systems Symposium, Lake Buena Vista, Fla., December 1990, pp. 173–179.

D. Powell (ed.), Delta-4: A Generic Architecture for Dependable Distributed Computing, Research Reports ESPRIT, Springer-Verlag, Berlin, 1991.

S. Mishra, L. L. Peterson and R. D. Schlichting, A membership protocol based on partial order, Proceedings of the Second International Working Conference on Dependable Computing for Critical Applications 2, Tucson, Ariz., February 1991, Dependable Computing and Fault-Tolerant Systems, vol. 6, Springer-Verlag, pp. 309–331.

F. Cristian, Reaching agreement on processor group membership in synchronous distributed systems, Distributed Computing, vol. 4, April 1991, pp. 175–187.

A. M. Ricciardi and K. P. Birman, Using process groups to implement failure detection in asynchronous environments, Proceedings of the Tenth Annual ACM Symposium on Principles of Distributed Computing, Montreal, Quebec, Canada, August 1991, pp. 341–353.

Y. Amir, D. Dolev, S. Kramer and D. Malki, Membership algorithms for multicast communication groups, Proceedings of the 6th International Workshop on Distributed Algorithms, Haifa, Israel, November 1992, pp. 292–312.

K. P. Birman and R. van Renesse, Reliable Distributed Computing with the Isis Toolkit, IEEE Computer Society Press, 1994.

L. E. Moser, P. M. Melliar-Smith and V. Agrawala, Processor membership in asynchronous distributed systems, IEEE Transactions on Parallel and Distributed Systems, vol. 5, no. 5, May 1994, pp. 459–473.

Y. Amir, L. E. Moser, P. M. Melliar-Smith, D. A. Agarwal and P. Ciarfella, The Totem single-ring ordering and membership protocol, ACM Transactions on Computer Systems, vol. 13, no. 4, November 1995, pp. 311–342.

L. E. Moser, P. M. Melliar-Smith, D. A. Agarwal, R. K. Budhia and C. A. Lingley-Papadopoulos, Totem: A fault-tolerant multicast group communication system, Communications of the ACM, vol. 39, no. 4, April 1996, pp. 54–63.

I. Keidar, J. Sussman, K. Marzullo and D. Dolev, A client-server oriented algorithm for virtually synchronous group membership in WANs, Proceedings of the 20th IEEE International Conference on Distributed Computing Systems, Taipei, Taiwan, April 2000, pp. 356–365.

M. Franceschetti and J. Bruck, A group membership algorithm with a practical specification, IEEE Transactions on Parallel and Distributed Systems, vol. 12, no. 11, November 2001, pp. 1190–2000.

DESCRIPTION OF RELATED ART

Many computer systems and applications structure objects into object groups or simply groups. For example, fault-tolerant systems are based on entity redundancy (replication), and the replicas of an entity are structured into a group. In software fault tolerance the entities that are typically replicated are the application processes. In hardware fault tolerance the entities that are replicated are processors and/or networks.

The term object is generally utilized herein to refer to an object, process, container, component, memory protection domain or processor, and the term group is generally utilized for referring to a set of objects.

Distributed systems achieve fault tolerance by allowing replicas of an object to be different computers, or to be hosted on different computers. In a distributed system a client invokes a method of a server by sending a request message, containing the method invocation, to the server. The server executes the method invocation and sends a reply message, containing the result of the method invocation, to the client. Both clients and servers can be members of groups, in which case the system contains both client groups and server groups. To ensure that all members of a group can receive messages reliably, even as the group membership changes, knowledge of the membership is required.

Objects can be replicated using active, semi-active or passive replication. In active replication all of the members of the group are equal, and all of the replicas execute the methods invoked on the group. In semi-active replication and passive replication one of the members of the group is the Primary and the other members are Backups. In both semi-active and passive replication, the Primary executes the methods invoked on the group. In semi-active replication the Backups receive and log the request and reply messages and perform the operations, but they do not multicast the request or reply messages. In passive replication the Backups receive and log the request and reply messages, but they do not perform the operations and do not multicast request or reply messages. The current invention applies to semi-active and passive replication.

The group membership problem is difficult because different members of the group can reach different decisions on whether the Primary is faulty and on the group membership, due to the asynchrony in the distributed system and the unreliability of the fault detectors. Most group membership algorithms employ a consensus algorithm to achieve agreement on the membership and on the Primary member of the group; however, achieving consensus in an asynchronous distributed system is impossible without the use of timeouts to bound the time within which a member must take an action. With timeouts, achieving consensus can be relatively costly in the delays that are incurred in reaching consensus and in recovering from a fault.

Many of the topics related to fault-tolerant distributed systems have been described in D. Powell, ed., Delta-4: A Generic Architecture for Dependable Distributed Computing, Springer-Verlag, 1991, incorporated herein by reference, including semi-active and passive replication. Multicast group communication has been used in distributed systems to maintain replica consistency (see, e.g., K. P. Birman and R. van Renesse, Reliable Distributed Computing with the Isis Toolkit, IEEE Computer Society Press, 1994, incorporated herein by reference, and L. E. Moser, P. M. Melliar-Smith, D. A. Agarwal, R. K. Budhia and C. A. Lingley-Papadopoulos, Totem: A fault-tolerant multicast group communication system, Communications of the ACM, vol. 39, no. 4, April 1996, pp. 54–63, incorporated herein by reference). Membership algorithms for group communication systems have been investigated by a number of researchers, as discussed below.

Membership protocols for group communication systems described in K. P. Birman and R. van Renesse, Reliable Distributed Computing with the Isis Toolkit, IEEE Computer Society Press, 1994, incorporated herein by reference, and L. E. Moser, P. M. Melliar-Smith, D. A. Agarwal, R. K. Budhia and C. A. Lingley-Papadopoulos, Totem: A fault-tolerant multicast group communication system, Communications of the ACM, vol. 39, no. 4, April 1996, pp. 54–63, incorporated herein by reference, use the term view change to represent any change in the membership of a group. In particular, each successive membership, which involves removal or addition of a member, constitutes a new view.

Kopetz et. al. (H. Kopetz, G. Grunsteidl and J. Reisinger, Fault-tolerant membership service in a distributed real-time system, Proceedings of the International Conference on Dependable Computing for Critical Applications, Santa Barbara, Calif., August 1989, pp. 167–174, incorporated herein by reference) have developed a lock-step synchronous membership algorithm for real-time distributed systems, based on a time-division multiple-access strategy.

Cristian (F. Cristian, Reaching agreement on processor-group membership in synchronous distributed systems, Distributed Computing, vol. 4, no. 4, April 1991,175–187, incorporated herein by reference) have also described membership algorithms for synchronous systems. Those membership algorithms require synchronized clocks and bounded message transmission times. Periodically, or on demand, each processor must reaffirm its existence.

Ezhilchelvan and de Lemos (P. D. Ezhilchelvan, and R. de Lemos, A robust group membership algorithm for distributed real-time systems, Proceedings of the IEEE Real-Time Systems Symposium, Lake Buena Vista, Fla., December 1990, pp. 173–179, incorporated herein by reference) have described a similar group membership algorithm for real-time distributed systems, based on time-division multiplexing. Each processor maintains a membership status vector, which contains the processor's view of the membership status of all processors. In every cycle a processor transmits its membership status vector and recomputes its membership status vector based on the membership status vectors that it has received from the other processors.

Ricciardi and Birman (A. M. Ricciardi and K. P. Birman, Using process groups to implement failure detection in asynchronous environments, Proceedings of the Tenth Annual ACM Symposium on Principles of Distributed Computing, Montreal, Quebec, Canada, August 1991, pp. 341–353, incorporated herein by reference) have presented a three-phase commit removal algorithm that requires 5n-9 point-to-point messages to remove a processor and a relatively long delay from failure to removal.

Mishra et. al. (S. Mishra, L. L. Peterson and R. D. Schlichting, A membership protocol based on partial order, Proceedings of the Second International Working Conference on Dependable Computing for Critical Applications 2, Tucson, Ariz., February 1991, Dependable Computing and Fault-Tolerant Systems, vol. 6, Springer-Verlag, pp. 309–331, incorporated herein by reference) have presented a membership protocol based on a partial order.

The membership algorithms of L. E. Moser, P. M. Melliar-Smith and V. Agrawala, Processor membership in asynchronous distributed systems, IEEE Transactions on Parallel and Distributed Systems, vol. 5, no. 5, May 1994, pp. 459–473, incorporated herein by reference, differ from other membership algorithms in that they operate on top of a fault-tolerant total ordering algorithm and they exploit the probabilistic behavior of the communication medium. The fault tolerance of the underlying total ordering algorithm allows the system to operate without interruption during membership changes.

The membership algorithms described in Y. Amir, D. Dolev, S. Kramer and D. Malki, Membership algorithms for multicast communication groups, Proceedings of the 6th International Workshop on Distributed Algorithms, Haifa, Israel, November 1992, pp. 292–312, incorporated herein by reference, and Y. Amir, L. E. Moser, P. M. Melliar-Smith, D. A. Agarwal and P. Ciarfella, The Totem single-ring ordering and membership protocol, ACM Transactions on Computer Systems, vol. 13, no. 4, November 1995, pp. 311–342, incorporated herein by reference, achieve consensus on the membership within a bounded time, even if further faults occur, by reducing the membership set until consensus is reached and by using timeouts that bound the time spent in any state of the membership algorithm. Those algorithms also handle network partitioning and remerging of components of a partitioned network.

Keidar et. al. (I. Keidar, J. Sussman, K. Marzullo and D. Dolev, A client-server oriented algorithm for virtually synchronous group membership in WANs, Proceedings of the 20th IEEE International Conference on Distributed Computing Systems, Taipei, Taiwan, April 2000, pp. 356–365, incorporated herein by reference) have presented membership algorithms that employ an event service to disseminate notifications of fault events, as well as membership changes due to processes joining or leaving a group. On receiving an event notification for a membership change, a server determines the new membership using a one-round membership algorithm that is fast but blocks if a fault occurs. The one-round membership algorithm is used in conjunction with a slower three-round membership algorithm that does not block.

M. Franceschetti and J. Bruck, A group membership algorithm with a practical specification, IEEE Transactions on Parallel and Distributed Systems, vol. 12, no. 11, November 2001, pp. 1190–2000, incorporated herein by reference, describes a membership algorithm in which a local fault detector informs a process of a change in its local connectivity view. The process with the smallest identifier in the new local connectivity view sends a Propose message to all processes in its view, proposing a membership change. Each process records the proposal until its new view is the same as the proposed view, at which point it sends an Accept message or a Retry message to the proposer, depending on whether it agrees with the proposed view number. If the proposer receives a Retry message, it sends a new Propose message containing a new view number to all processes in its view. When the proposer has collected Accept messages from all processes in its view, it sends a Commit message. On receiving a Commit message, a process commits the new membership.

U.S. Pat. Nos. 5,696,896, 5,699,501 and 5,704,032, each of which is incorporated herein by reference, describe a group membership and group leader selection strategy in which the new group leader is selected from a membership list that is ordered in the sequence of joins to the membership. The selected leader is the next processor on the membership list after the failed group leader; in particular, it is the next active processor on the membership list. The group of processors is informed of the new group leader, after it is selected.

U.S. Pat. Nos. 5,787,249, 5,787,250 and 5,793,962, each of which is incorporated herein by reference, describe a method, program product and system for managing the membership of a group of processors in a distributed system. Processors may request to join the group of processors, and then are added to the group. Similarly, processors may request to leave the group or can fail, and then are removed from the group. The group of processors receives multicasts that are initiated by the members of the group. The group has a group leader that controls the actions that the group members perform, and the group leader is selected by a voting protocol that provides the consensus necessary to ensure that all group members agree on the group leader. In contrast, the present invention requires no consensus protocol.

U.S. Pat. No. 5,923,831, which is incorporated herein by reference, discloses a method of coordinating the membership of a group of processes in a distributed system. Initially, each process sends the other processes its view of their statuses, and then waits, up to a predetermined timeout, for similar views from the other processors, except those that, in its own view, have failed. Each process then generates a resulting view by intersecting its local view with the views that it has received from the other processes. The local views are updated based on the resulting views and are again exchanged, until a termination condition occurs. The algorithm of that invention is similar to the membership algorithms described in Y. Amir, D. Dolev, S. Kramer, D. Malki, Membership algorithms for multicast communication groups, Proceedings of the Workshop on Distributed Algorithms, Haifa, Israel, November 1992, pp. 292–312, incorporated herein by reference, and Y. Amir, L. E. Moser, P. M. Melliar-Smith, D. A. Agarwal and P. Ciarfella, The Totem single-ring ordering and membership protocol, ACM Transactions on Computer Systems, vol. 13, no. 4, November 1995, pp. 311–342, incorporated herein by reference.

U.S. Pat. No. 5,999,712, which is incorporated herein by reference, discloses a method for determining the cluster membership in a distributed system by broadcasting, either directly or indirectly, connectivity information about the nodes with which it is able to communicate. Each node elects a new cluster from the clusters that the various nodes proposed, using some deterministic algorithm, such as the cluster that is proposed more often than any other cluster.

Based on the foregoing, it can be seen that a need exists for a method of maintaining consistent group membership in distributed systems subject to semi-active and passive replication and that may be utilized within fault-tolerant systems without the need for a consensus decision and without excess overhead. The present invention satisfies those needs, as well as others, and overcomes the deficiencies of previously developed group membership methods.

BRIEF SUMMARY OF THE INVENTION

This invention addresses the group membership problem in a fault-tolerant distributed system that is based on Semi-Active or Passive replication, where the Primary member of the group acts as the leader of the group and the Backup members act as followers. The mechanisms of the present invention are particularly suited to groups of replicas that provide fault tolerance, but are also useful for groups that are formed to achieve other objectives, where those groups must survive faults in their members.

A group membership algorithm, and in particular the group membership algorithm of the present invention described herein, ensures that the members of the group have a consistent view of the membership set and of the member of the group that is the Primary. The mechanisms of the present invention effect a membership change and a consistent view of the membership more quickly than other membership algorithms by avoiding the need for a multiple-round consensus algorithm.

In one embodiment, each member of the group is assigned a rank. The Primary has the lowest rank (rank=1) and the Backups have higher ranks. Each member of the group is also assigned a unique precedence, determined by the order in which it is added to the group.

It should be appreciated that it is the relationship of the ranks and precedences which is important in the present invention, wherein the terms "lower" and "higher" can be reversed so long as the associated execution is modified.

In one embodiment of the membership algorithm of the present invention, the Primary determines the addition of Backups to, and the removal of Backups from, the group. The Backup that first announces the failure of the Primary decides the new membership and becomes the new Primary, unless a Backup with a higher precedence also announces the failure of the Primary and claims to be the new Primary.

Each Backup monitors the behavior of the Primary, using a fault detection timeout that is determined by the Backup's rank. A Backup detects that the Primary is faulty if it detects a lack of valid activity from the Primary member, such as not receiving a message from the Primary within a fault detection timeout interval. The Backup of rank=2 uses a short timeout to detect that the Primary is faulty. The Backup of rank=3 uses a longer timeout to detect that the Primary is faulty, allowing time for the Backup of rank=2 to react to the fault in the Primary. If the fault detection timeout for the Primary at the Backup of rank=3 expires, the Backup of rank=3 determines that both the Primary and the Backup of rank=2 are faulty. The Backup of rank=4 uses an even longer timeout to detect that the Primary is faulty. If the fault detection timeout for the Primary at the Backup of rank=4 expires, the Backup of rank=4 determines that the Primary, the Backup of rank=2 and the Backup of rank=3 are faulty. If more than three Backups are used, the mechanisms are similar.

If two Backups both determine that the Primary is faulty and claim to be the new Primary, the Backup with the higher precedence assumes the role of the Primary. Thus, the Backup of rank=3 has authority over both the Primary and the Backup of rank=2 to reconfigure the membership, and the Backup of rank=4 has authority over the Primary, the Backup of rank=2 and the Backup of rank=3 to reconfigure the membership. Consequently, the Backup with the highest precedence has the greatest authority over the Primary and the other Backups to reconfigure the membership but, because it has the highest rank, it has the longest fault detection timeout and thus is the slowest to exercise that authority.

The advantages of the group membership algorithm disclosed here are that a consensus decision is not required to reconfigure the membership and that a membership change can be effected more quickly in the common case where the Backup of rank=2 takes control as the new Primary when it determines that the existing Primary has failed.

Note that membership protocols for group communication systems define a view change as occurring in response to any change in the membership of a group. By contrast, in the present invention, only membership changes that correspond to a change of the Primary constitute a new view. This new view is referred to herein as a primary view change. Each such new primary view has a primary view sequence number.

Note also that use of consensus algorithms for achieving agreement on group membership require the use of timeouts and have a number of disadvantages. The group membership algorithm of the present invention achieves consistent group membership among the members of a group in a distributed system. One of the members of the group is distinguished as the Primary (leader) and the other members of the group are Backups (followers):

without incurring the delays of a consensus algorithm;

without incurring the overhead of the large number of messages that must be transmitted to achieve consensus; and without incurring a risk that different members of the group will reach different decisions about the membership and about which member is the Primary, even though a consensus algorithm is not used.

The present invention provides a zero-round membership algorithm, which is in contrast to the use of conventional membership algorithms that require one or more rounds but which block if a fault occurs, or three rounds to perform the membership algorithm without blocking.

Similar to some conventional systems, the present invention orders the membership list from which a new group leader can be selected. However, within the present invention every Backup is responsible for monitoring the behavior of the Primary and for forming a new membership, if necessary.

It can be seen, therefore, that an aspect of the invention is to provide fault tolerance in a distributed system based on Semi-Active or Passive replication.

Another aspect of the invention is utilizing a group membership method in which the Primary member of the group acts as the leader of the group and the Backup members act as followers.

Another aspect of the invention is that of having the Primary member of the group maintain memberships for the group and to distribute membership information.

Another aspect of the invention is the use of rank and precedence for the members of the group to determine which Backup is to take over as the next Primary in the event of a failure of the Primary.

Another aspect of the invention is that the Primary and Backups need not have information about the addition or removal of Backups from a remote group with which they are communicating.

Another aspect of the invention is that Backups of higher ranks utilize timeouts of greater lengths, wherein a Backup is selected for replacing the Primary even if other Backups are faulty.

Another aspect of the invention is that Backups of higher ranks have greater authority over the Primary and Backups of lower ranks in the event of failure of the Primary, but have a longer delay so as not to take over if a Backup of lower rank is operational.

A still further aspect of the invention is that the Primary and Backups only need to discover when there is a change in the Primary of a remote group with which they are communicating and don't need to discover all changes in the remote membership if those changes involve the addition or removal of a Backup.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE PREFERRED EMBODIMENT

Figure 1:
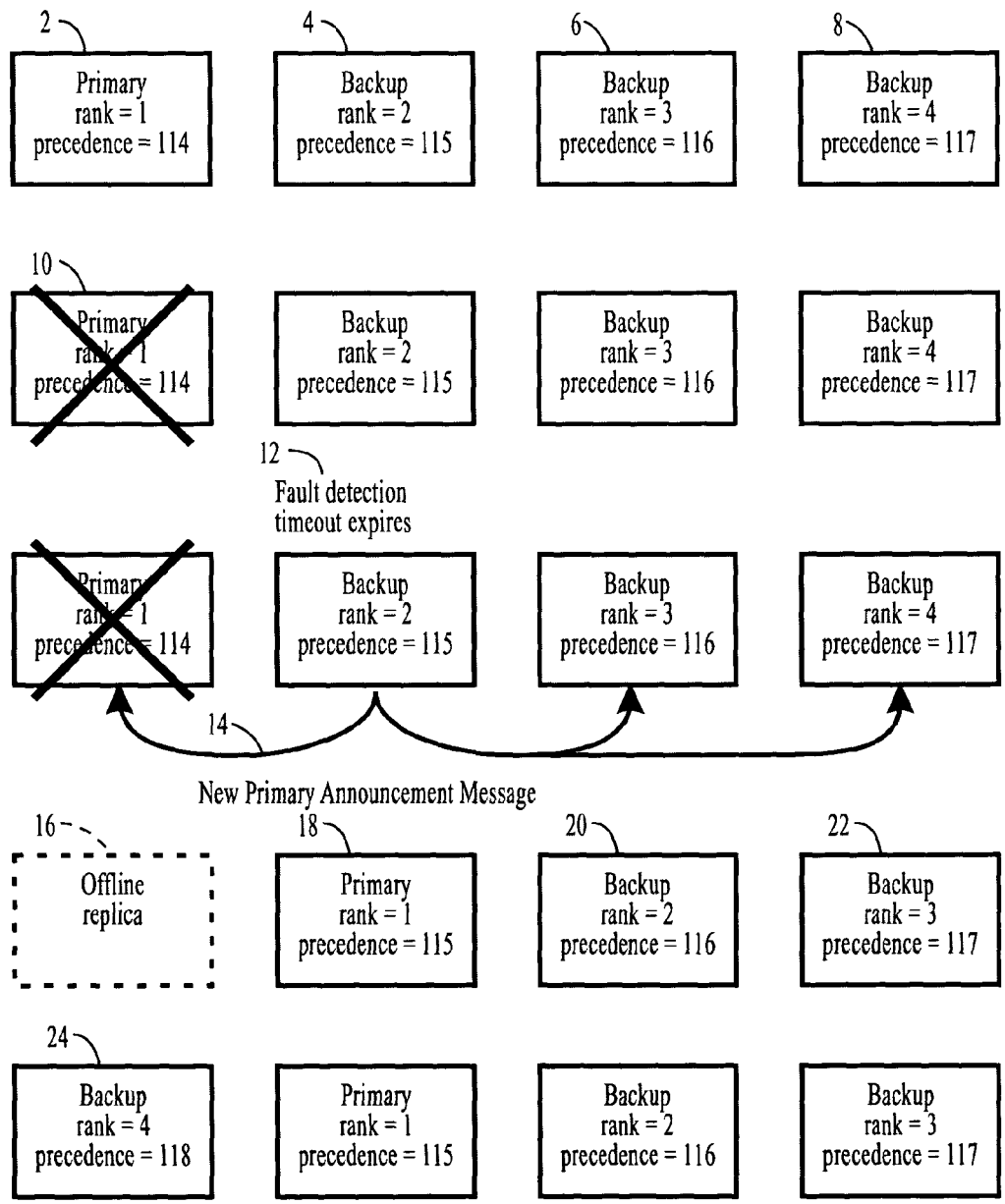
FIG. 1 is a diagram of a group membership sequence according to an aspect of the present invention, showing actions arising following a fault in the Primary and the expiration of the fault detection timeout for the Primary in the Backup of rank=2.

The context in which this invention is described is an application that is replicated using Semi-Active or Passive replication, where the members of the group are distributed across multiple computers within a distributed computer system.

When an application is replicated for fault tolerance, using Semi-Active or Passive replication, there is a single Primary replica and one or more Backup replicas, where the replicas constitute a group. In other usages of groups, it is also convenient to designate one of the members as the Primary and the other members as Backups.

In this invention the term object is used to refer to the entities that are replicated, which may be processes, containers, components, memory protection domains or processors. The invention is described in terms of a client that invokes methods of a server, although an object can act as both a client and a server in a multi-tier or peer-to-peer application, where the server also acts as a client and invokes methods of other servers. The invention applies to both client and server groups. The invention also makes reference to messages being multicast to members of the group, which can consist of a single transmission or multiple point-to-point transmissions. The mechanisms of the current invention are unaffected by such extensions.

The diagrams and the descriptions shown below will further illustrate the preferred embodiments of this invention.

Membership Algorithm

The membership algorithm that is the subject of this invention uses the Primary member of the group to maintain the membership of the group and to distribute membership information. If the Primary fails, one of the Backups assumes the role of the Primary. The algorithm uses the notions of rank and precedence to determine, in the event of the failure of the Primary, which of the Backups is to become the next Primary. The precedence of a member of a group is determined by the order in which it is added to the group. The rank of the Primary member is 1, and the rank of each Backup member is greater than 1 and determines the Backup's fault detection timeout for the Primary.

To achieve reliable message delivery, both the Primary and the Backups need to know when there is a change in the Primary of a remote group with which they are communicating. Moreover, both the Primary and the Backups need to know the membership of their own group because it affects their ranks and their precedences in that group. However, the Primary and the Backups do not need to know about the addition of a Backup to, or removal of a Backup from, a remote group.

The Primary determines the addition of a new Backup to, and the removal of a Backup from, the group. Each Backup monitors the behavior of the Primary using a fault detection timeout that is determined by its rank. A Backup detects that the Primary is faulty if it does not receive a message from the Primary within the timeout.

The Backup of rank=2 uses a short timeout to detect that the Primary is faulty. The Backup of rank=3 uses a longer timeout, allowing time for the Backup of rank=2 to react to the fault in the Primary. The Backup of rank=4 uses an even longer timeout and so on.

If the fault detection timeout for the Primary at the Backup of rank=3 occurs, the Backup of rank=3 determines that both the Primary and the Backup of rank=2 are faulty. If the fault detection timeout for the Primary at the Backup of rank=4 occurs, the Backup of rank=4 determines that the Primary, the Backup of rank=2 and the Backup of rank=3 are faulty.

If two Backups both determine that the Primary is faulty and claim to be the new Primary, the Backup with the higher precedence assumes the role of the Primary. The Backup of rank=3 has authority over both the Primary and the Backup of rank=2 to reconfigure the membership, and the Backup of rank=4 has authority over the Primary, the Backup of rank=2 and the Backup of rank=3 to reconfigure the membership. Thus, the Backup with the highest precedence has the greatest authority to reconfigure the membership but, because it has the highest rank, it has the longest fault detection timeout for the Primary and thus is the slowest to exercise that authority.

Each message header, for both regular application messages and membership messages, has a primary view number field, primaryViewNum. The primaryViewNum is the number of membership changes that involve a change in the Primary. The primaryViewNum allows the Primary and the Backups to discover when there is a change in the primary view of a remote group with which they are communicating, i.e., that there is a new Primary for the remote group and, consequently, that request, reply and other messages multicast to, or multicast by, the former Primary of the remote group might have been lost. This primaryViewNum is different from the view number, used by multicast group communication systems, that changes whenever any change in the membership occurs, including adding and removing not only the Primary but also the Backups.

The membership of a group is changed by means of AnnouncePrimary, AddBackup and RemoveBackup membership messages. The AnnouncePrimary message is multicast by a Backup to request or confirm a change of the Primary. The AddBackup message is used by the Primary to add a Backup to the group. The RemoveBackup message is used by the Primary to remove a Backup from the group.

Change of the Primary

Figure 2:
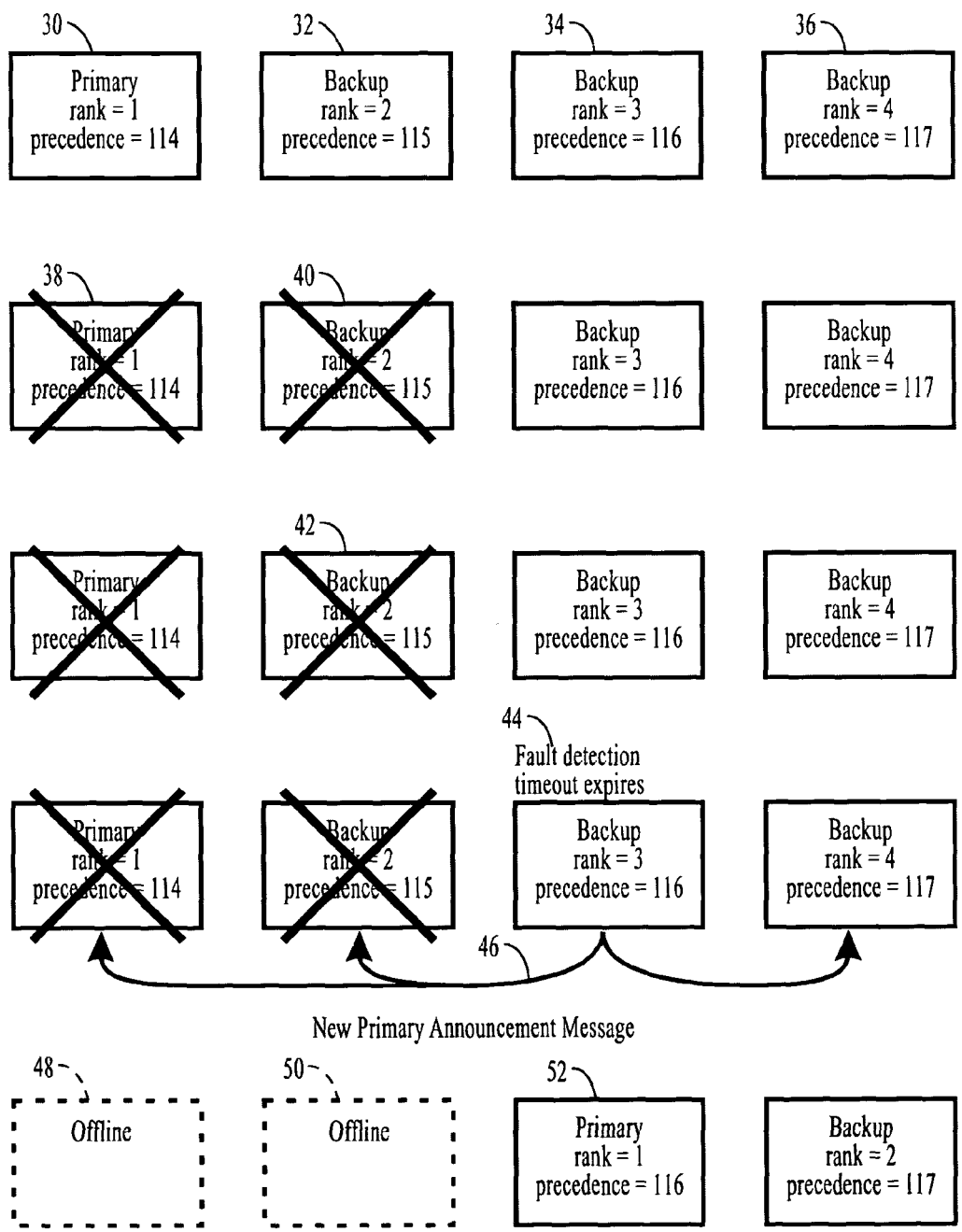
FIG. 2 is a diagram of a group membership sequence according to an aspect of the present invention, showing actions arising following faults in the Primary and in the Backup of rank=2, and the expiration of the fault detection timeout for the Primary in the Backup of rank=3.
Figure 3:
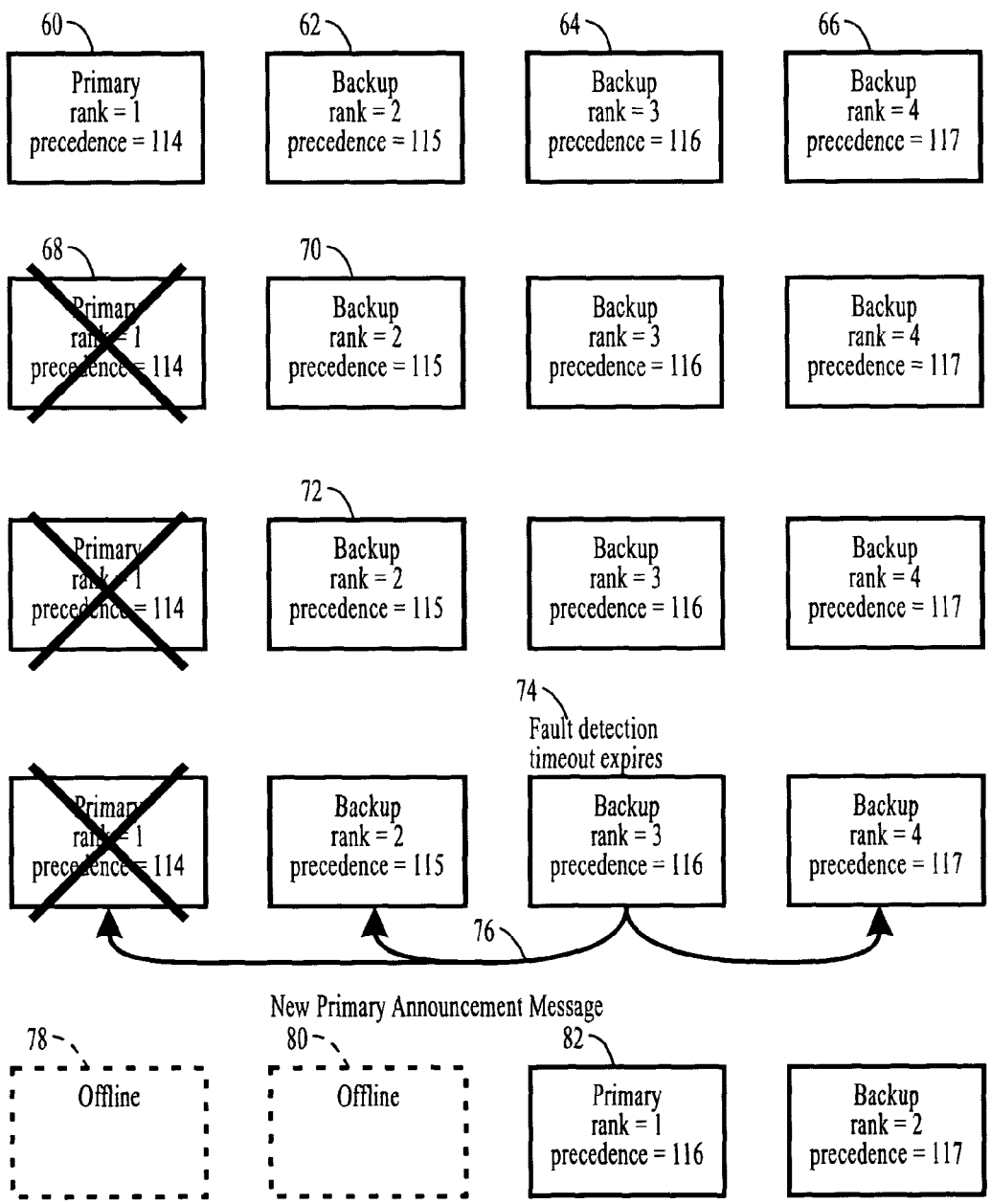
FIG. 3 is a diagram of a group membership sequence according to an aspect of the present invention, showing actions following a fault in the Primary and the expiration of the fault detection timeout for the Primary in the Backup of rank=3, before the expiration of the fault detection timeout for the Primary in the Backup of rank=2.

The Primary is removed from the group either because it is determined to be faulty or for some other reason such as resource management. FIG. 1, FIG. 2 and FIG. 3 illustrate three different scenarios in which the Primary has been detected to be faulty.

The members of a group are ordered by rank r, where the Primary has rank=1 and the Backups have rank>=2. The ranks determine which Backup becomes the next Primary, if the Primary fails. If the Backup of rank=2 also fails, the Backup of rank=3 is the next-in-line, and so forth.

To minimize the risk that two Backups both claim to be the next new Primary, the fault detection timeouts for the Primary in the Backups increase with increasing rank. For example, the Backup of rank=2 might have a timeout of 10 ms, the Backup of rank=3 a timeout of 30 ms and the Backup of rank=4 a timeout of 50 ms. Thus, the 30 ms timeout for the Backup of rank=3 allows 10 ms of inaction by the Primary, 10 ms of inaction by the Backup of rank=2 and 10 ms for skew between the timeouts for the Primary in the different Backups. Triggering the Backup of rank=3, with its longer timeout, is rare, while race conditions are even more rare.

To eliminate the possibility that two Backups both claim to be the next new Primary, the members are ordered by precedence wherein, if member m1 has precedence p1 and member m2 has precedence p2, and p1<p2, then member m1 was added to the group before member m2. Thus, if two Backups of different ranks both claim to be the next new Primary, the Backup with the higher precedence breaks the tie and becomes the new Primary.

If a Backup detects that the Primary is faulty, because it has not received a message from the Primary before the timeout (FIG. 4), the Backup multicasts an AnnouncePrimary message to its local group, denouncing the current Primary and appointing itself as the new Primary. The header of the AnnouncePrimary message contains the group identifier and the primary view number before the membership change, and the payload contains the Backup's identifier, rank r and precedence p. Effectively, the Backup of precedence p excludes the old Primary and the Backups of precedences<p from the membership. Such a Backup of precedence<p did not send an AnnouncePrimary message quickly enough to become the new Primary and, thus, the Backup of precedence p declares the Backups of precedence<p to be faulty.

A Backup does not multicast an AnnouncePrimary message that promotes itself as the new Primary before its timeout for the existing Primary expires.

If a Backup receives an AnnouncePrimary message for a new membership (FIG. 5) and the precedence of the proposed Primary is less than the precedence of the current Primary, the Backup ignores the AnnouncePrimary message. If a Backup receives an AnnouncePrimary message with a precedence p for the proposed new Primary, the Backup subsequently ignores any AnnouncePrimary message with a precedence for the proposed new Primary less than p.

When a Backup receives an AnnouncePrimary message for a new primary view, the Backup resets its fault detection timeouts.

Addition of a Backup

A Backup is added to a group for any of a number of reasons, such as the minimum number of members having fallen below a desired threshold.

The Primary adds the new Backup member to its local copy of the group membership set and then multicasts an AddBackup message, containing the identifier, precedence and rank of the Backup that it is adding to the group, as shown in FIG. 6 through FIG. 9.

When a Backup receives the AddBackup message, it adds the new member as a Backup to its local copy of the group membership, with the identifier, precedence and rank of the new Backup contained in the AddBackup message.

Removal of a Backup

A Backup member is removed from a group because it is determined to be faulty or for some other reason.

The Primary removes the Backup from its local copy of the group membership set and then multicasts a Remove-Backup message, containing the identifier of the Backup that it is removing from the group, to the group.

When a Backup receives the RemoveBackup message, containing the identifier of the Backup being removed, it removes the Backup from its local copy of the group membership set.

Detection of a Fault in the Primary by the Backup of Rank=2 in FIG. 1 there are four members 2, 4, 6 and 8. Of these, the Primary 2 has rank=1 and precedence=114, the Backup 4 of rank=2 has precedence=115, the Backup 6 of rank=3 has precedence=116 and the Backup 8 of rank=4 has precedence=117. The number of Backups is determined by the nature of the application, the hardware/software platform and the degree of resilience required; three Backups are shown for illustration purposes.

After a period of normal fault-free operation, the Primary becomes faulty 10. This fault is not detected immediately; rather, after a short period of time, the fault detection timeout for the Primary in the Backup of rank=2 expires 12 and the Backup of rank=2 detects the fault in the Primary. The fault detection timeout for the Primary in the Backup of rank=2 is likely to expire before the fault detection timeout for the Primary in the Backup of rank=3 or the Backup of rank=4, because the timeout in the Backup of rank=2 is shorter than the other timeouts.

When the Backup of rank=2 detects a fault in the Primary 12, the Backup of rank=2 multicasts a message that announces the fault and that it is forming a new membership with itself as the Primary 14. Once it has multicast that message, the Backup of rank=2 determines that the faulty Primary is offline 16 and the Backup of rank=2 then becomes the new Primary 18. The Backup of rank=3 and the Backup of rank=4 remain Backups, but the former Backup of rank=3 becomes a Backup 20 of rank=2 and the former Backup of rank=4 becomes a Backup 22 of rank=3. Their precedences remain unchanged.

If, after it has been repaired, the former Primary rejoins the group, it does so as a Backup 24 of rank=4, that is one greater than the highest rank of any of the current members of the group, and with a precedence=118, that is one greater than the highest precedence of any current or prior member of the group.

Detection of a Fault in the Primary by the Backup of Rank=3

FIG. 2 shows the same set of four members as FIG. 1, with a Primary 30 and three Backups 32, 34 and 36. In FIG. 2, however, the Primary becomes faulty 38 and the Backup of rank=2 also becomes faulty 40. Because the Backup of rank=2 is faulty, its fault detection timeout does not expire and the Backup of rank=2 does not detect the fault in the Primary at the time at which it would have been expected to do so 42.

Consequently, after a slightly longer delay, the fault detection timeout for the Primary in the Backup of rank=3 expires 44 and the Backup of rank=3 determines that both the Primary and the Backup of rank=2 are faulty. The Backup of rank=3 multicasts 46 a message that announces the faults and also a new membership with itself as the Primary. Once it has multicast the message, the Backup of rank=3 determines that the former Primary that failed is offline 48 and that the Backup of rank=2 that failed is offline 50. The former Backup of rank=3 then assumes the role of the new Primary 52.

Detection of a Fault in the Primary by the Backup of Rank=3 when the Backup of Rank=2 is not Faulty FIG. 3 shows the same set of four members, with a Primary 60 and three Backups 62, 64 and 66. In FIG. 3 the Primary becomes faulty 68, but the Backup of rank=2 does not become faulty 70. For whatever reason, the Backup of rank=2 does not detect the faulty Primary at the time at which it is expected to detect the fault 72.

Consequently, after a slightly longer delay, the fault detection timeout for the Primary in the Backup of rank=3 expires 74 and the Backup of rank=3 determines that both the Primary and the Backup of rank=2 are faulty. The Backup of rank=3 then multicasts a message 76 that announces those faults and also a new membership with itself as the Primary. Once it has multicast that message, the Backup of rank=3 determines that the old Primary and the Backup of rank=2 are offline 78, 80 and the Backup of rank=3 then becomes the new Primary 82. When the former Backup of rank=2 receives the announcement of the new membership, multicast by the former Backup of rank=3, the former Backup of rank=2 determines that the new Primary has a precedence greater than its own precedence, removes itself from the membership and places itself offline. Subsequently, the former Backup of rank=2 can apply for readmission to the membership.

Figure 4:
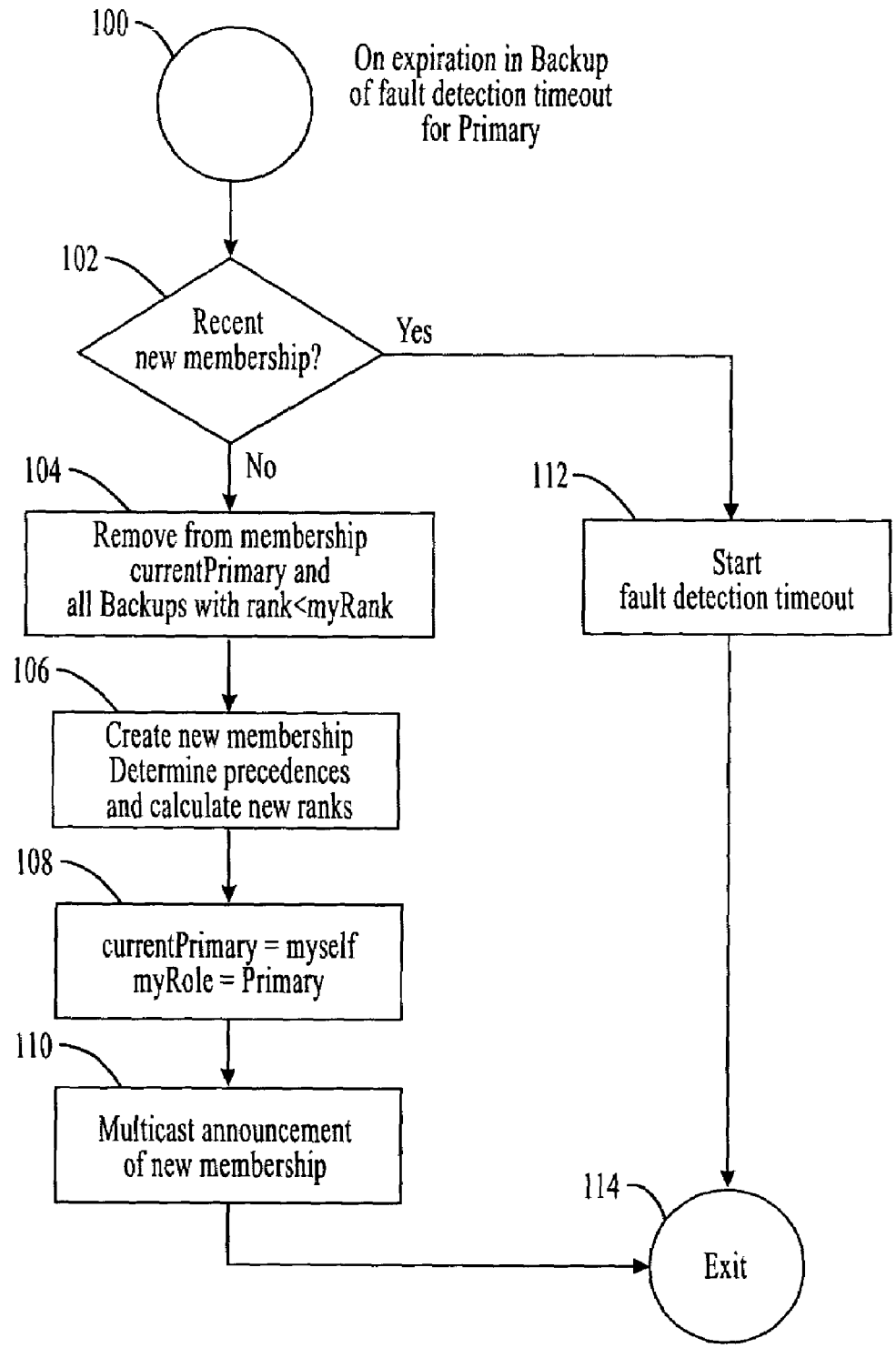
FIG. 4 is a flowchart of processing according to an aspect of the present invention, shown on expiration of a fault detection timeout for a Backup.

Actions of a Backup when its Fault Detection Timeout for the Primary Expires FIG. 4 is a flow diagram that shows the actions of a Backup when its fault detection timeout for the Primary expires 100. First, the Backup checks whether its membership is a recent new membership 102. If the membership is a recent new membership, the Backup starts a fault detection timeout for the Primary 112 and then exits 114. Otherwise, the Backup removes the Primary and all Backups with ranks less than its own rank 104. The Backup then creates a new membership set, determines the precedences and calculates the ranks of the members in that membership set 106, and appoints itself as the new Primary 108. It then multicasts a message that contains an announcement of the new membership, along with the precedences and ranks of the members 110, and exits 114.

In general, the steps executed on expiration of the fault detection timeout for the Primary in a Backup, comprise the following:
if recent new membership
  start fault detection timeout
else
  remove current Primary from membership
  remove all Backups with rank<myRank from the membership
  create new membership
  determine precedences and calculate ranks
  currentPrimary=myself
  myRole=Primary
  multicast announcement of new membership along with precedences and ranks

Action of a Member on Receipt of an Announcement of a New Membership

Figure 5:
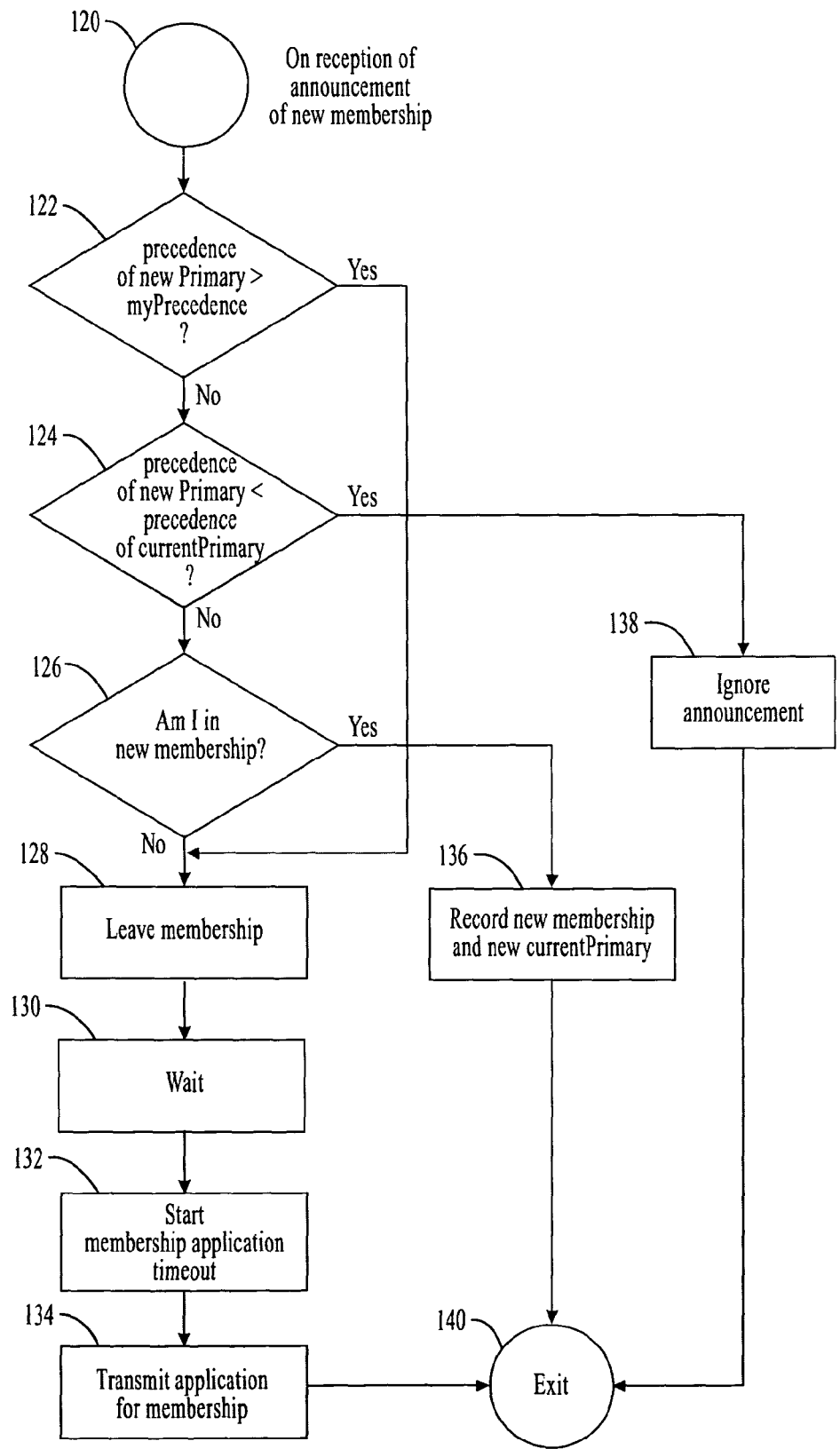
FIG. 5 is a flowchart of processing according to an aspect of the present invention, shown when a member receives a message containing an announcement of a new membership.

FIG. 5 is a flow diagram that shows the actions of a member on reception of an announcement of a new membership 120. First, the member checks whether the precedence of the new Primary is greater than its own precedence 122. If the precedence of the new Primary is greater than its own precedence, it leaves the membership 128, waits for the membership to stabilize 130, starts a membership application timeout 132, transmits an application for membership 134 and exits 140.

If the precedence of the new Primary is less than or equal to its own precedence, the member checks whether the precedence of the new Primary is less than the precedence of the current Primary 124. If the precedence of the new Primary is less than the precedence of the current Primary, it ignores the announcement 138 and exits 140.

If the precedence of the new Primary is greater than or equal to the precedence of the current Primary, the member checks whether it is in the new membership 126. If it is in the new membership, the member records the new membership, including the ranks and precedences of the members, and the new current Primary 136 and exits 140.

If it is not in the new membership, the member leaves the membership 128, waits for the membership to stabilize 130, starts the membership application timeout 132, multicasts an application for membership 134 and exits 140.

In general, the steps executed on reception of announcement of a new membership, comprise:
if precedence of new Primary>myPrecedence
  leave membership
  wait for the membership to stabilize
  start membership application timeout
  multicast application for membership
else
  if precedence of new Primary>=precedence of currentPrimary
    if I am in the new membership
      record new membership and currentPrimary
        including ranks and precedences
    else
      leave membership
      wait for the membership to stabilize
      start membership application timeout
      multicast application for membership
  else
    ignore announcement

Figure 6:
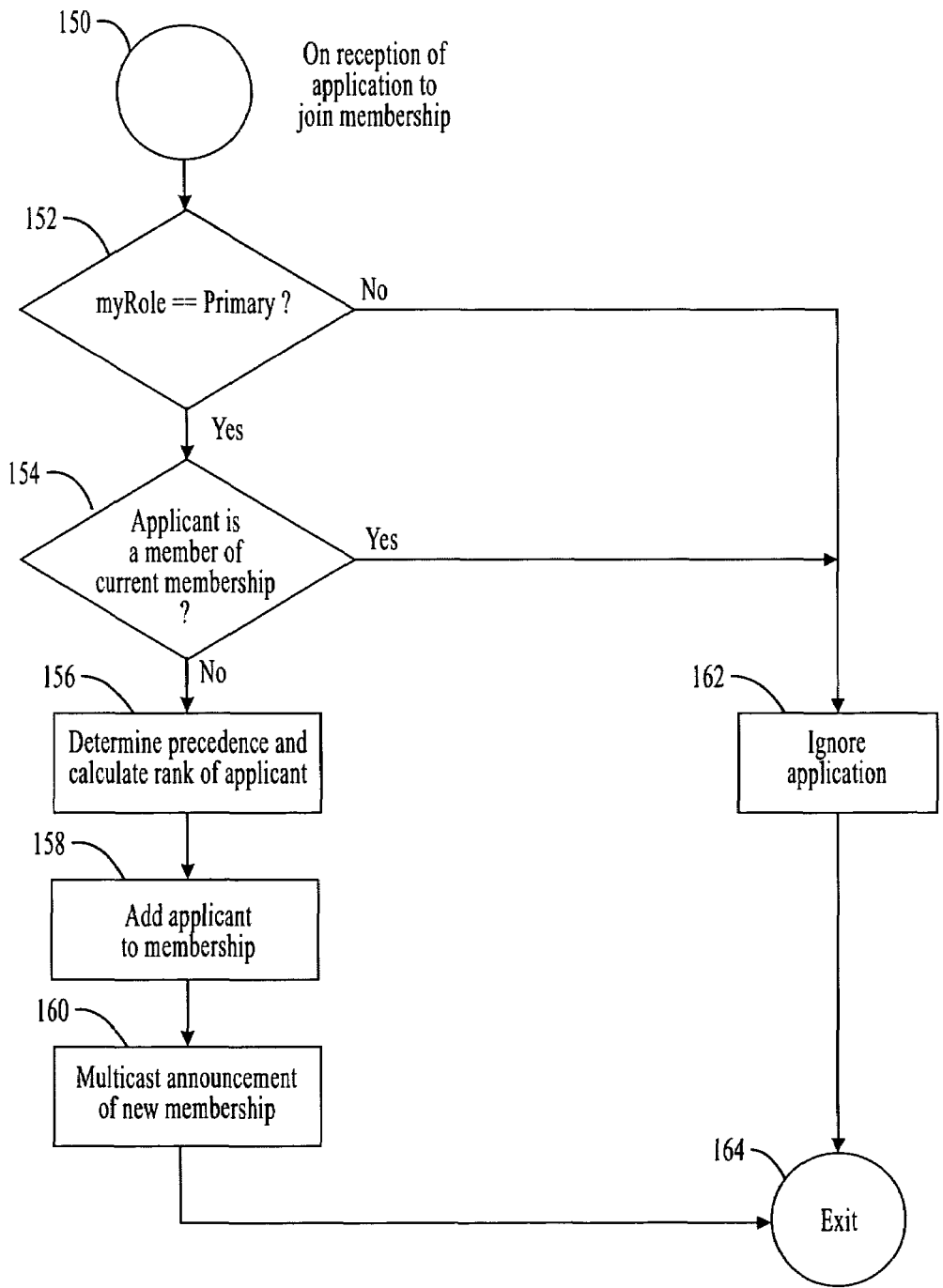
FIG. 6 is a flowchart of processing for a Primary according to an aspect of the present invention, shown upon receiving a message to add a new member to the group.

Actions of a Member when it Receives an Applicant's Request to Join the Membership FIG. 6 is a flow diagram that shows the actions of a member when it receives an application to join the membership 150. First, the member checks whether it is the Primary 152. If it is not the Primary, the member ignores the application 162 and exits 164.

If the member is the Primary, it checks whether the applicant is a member of the current membership 154. If the applicant is a member of the current membership, the Primary ignores the application 162 and exits 164.

If the applicant is not a member of the current membership, the Primary determines the precedence and calculates the rank for the new applicant member 156, adds the applicant to its local copy of the membership 158, multicasts an announcement of the new membership along with the precedences and ranks of the members 160 and exits 164.

The following general steps are performed when a member receives an application to join the membership:

if myRole ==Primary
    if the applicant is not already a member
      determine precedence and calculate rank of new member
      add the applicant to membership
      multicast announcement of new membership along with precedences and ranks
    else
      ignore application

Figure 7:
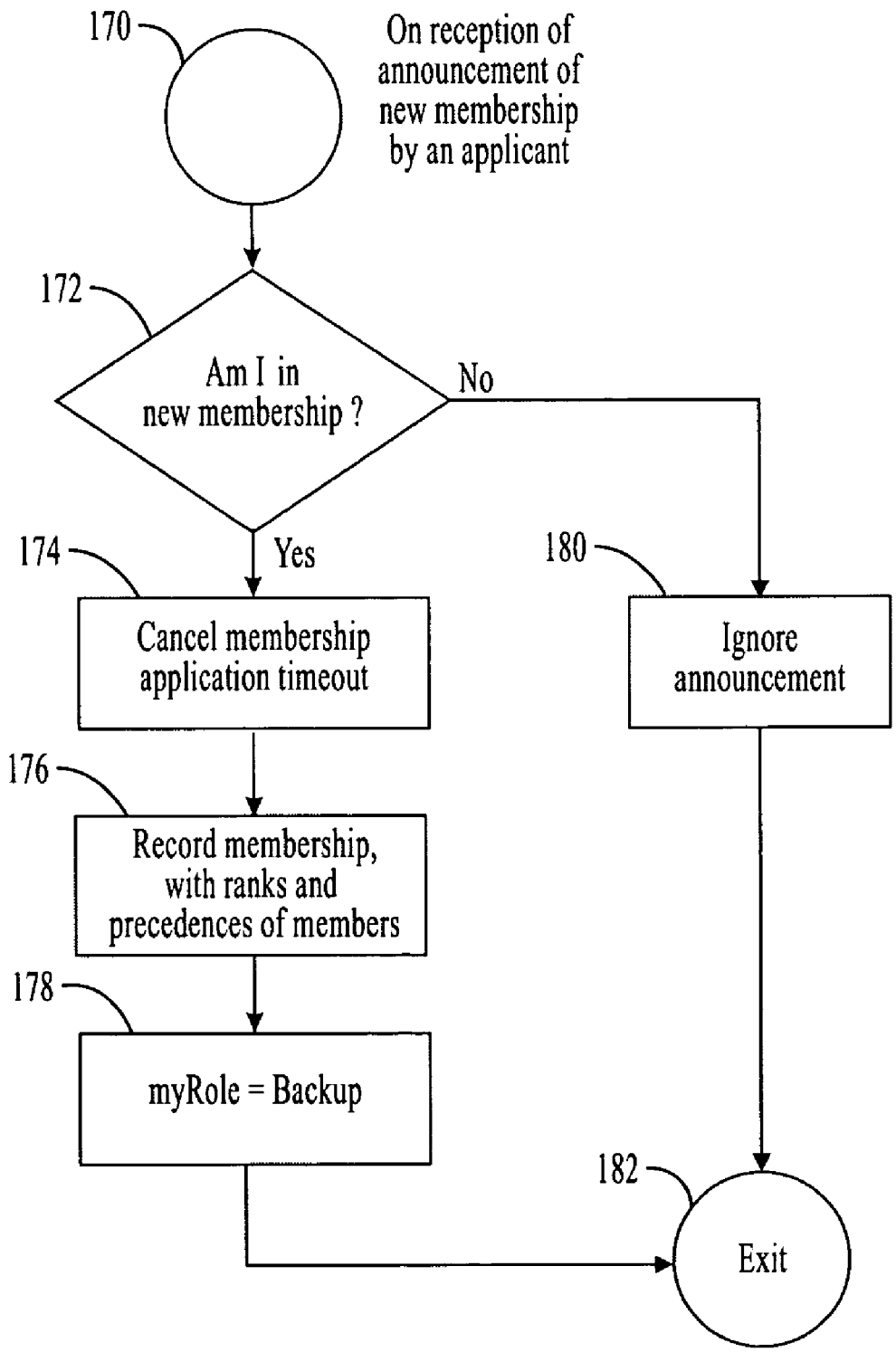
FIG. 7 is a flowchart of processing for an applicant according to an aspect of the present invention, showing a response to receipt of a message containing an announcement of a new membership.

Actions of an Applicant when it Receives an Announcement of a New Membership FIG. 7 is a flow diagram that shows the actions of an applicant for membership when it receives an announcement of a new membership 170. First, the applicant checks whether it is in the new membership 172. If it is not in the new membership, the applicant ignores the announcement 180 and exits 182.

If it is in the new membership, the applicant cancels the membership application timeout 174, records the membership along with the ranks and precedences of the members 176, sets its role to Backup 178 and exits 182.

The following general steps are performed when the applicant for membership receives an announcement of new membership:

if I am the applicant and I am in the new membership
    cancel membership application timeout
    record membership of group along with
      ranks and precedences
    myRole=Backup
  else
    ignore announcement

Figure 8:
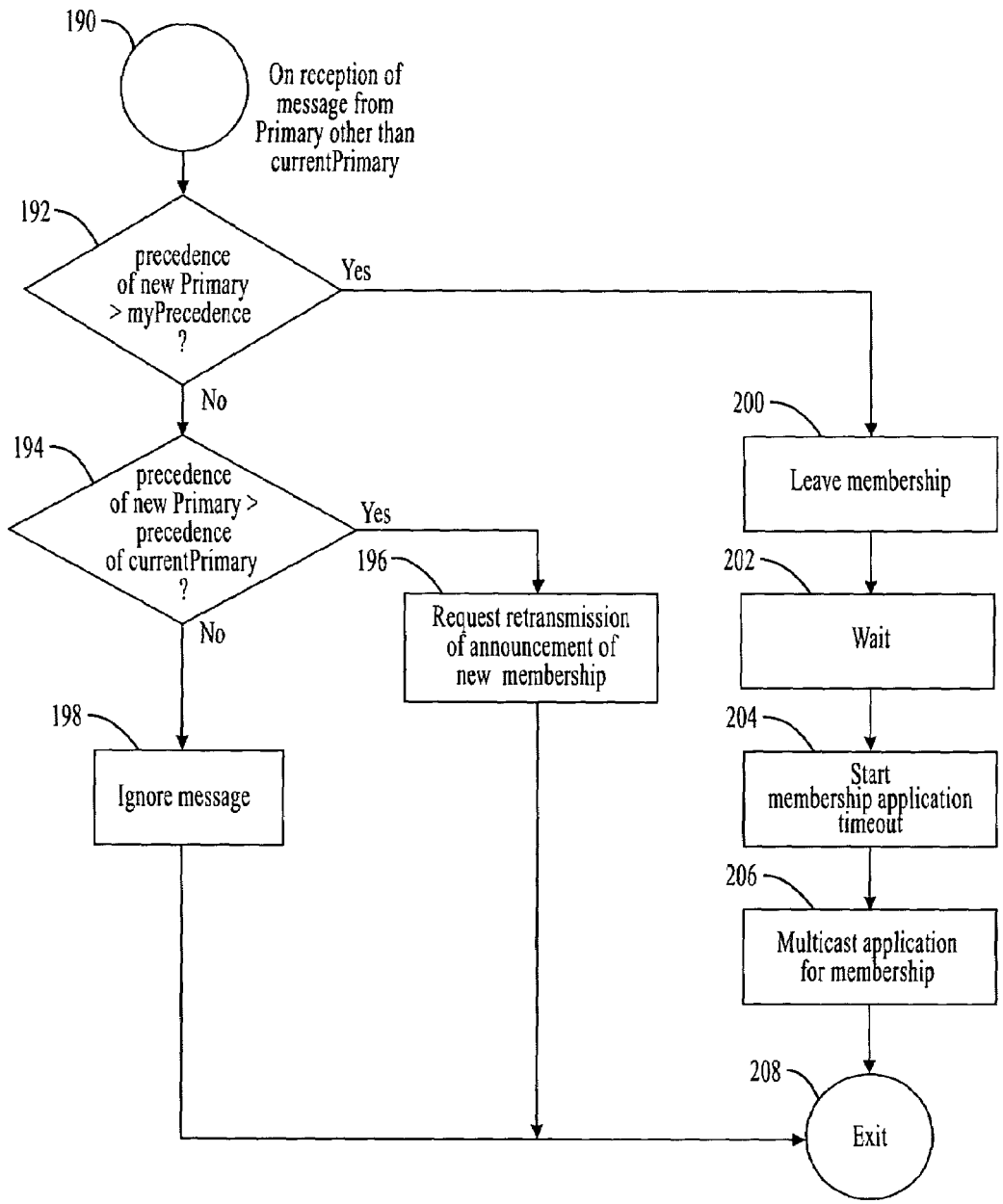
FIG. 8 is a flowchart of processing for a member according to an aspect of the present invention, shown in response to receiving a message from a Primary other than the current Primary.

Actions of a Member when it Receives a Message from a Primary Other than its Current Primary FIG. 8 is a flow diagram that shows the actions of a member when it receives a message from a Primary other than its current Primary 190. First, it checks whether the precedence of the new Primary is greater than its own precedence 192. If the precedence of the new Primary is greater than its own precedence, the member leaves the membership 200, waits for the membership to stabilize 202, starts the membership application timeout 204, multicasts an application for membership 206 and exits 208.

If the precedence of the new Primary is less than or equal to its own precedence, the member checks whether the precedence of the new Primary is greater than the precedence of the current Primary 194. If the precedence of the new Primary is greater than the precedence of the current Primary, the member requests retransmission of the announcement of the new membership by the new Primary 196 and exits 208.

If the precedence of the new Primary is less than or equal to the precedence of the current Primary, the member ignores the message 198 and exits 208.

The following general steps are performed on reception of a message from a Primary other than the current Primary:

if precedence of new Primary>myPrecedence
    leave membership
    wait for the membership to stabilize
    start membership application timeout
    multicast application for membership
  else
    if precedence of new Primary>precedence of currentPrimary
      request retransmission of announcement of new membership
    else
      ignore message

Actions of an Applicant when a Membership Application Timeout Expires

Figure 9:
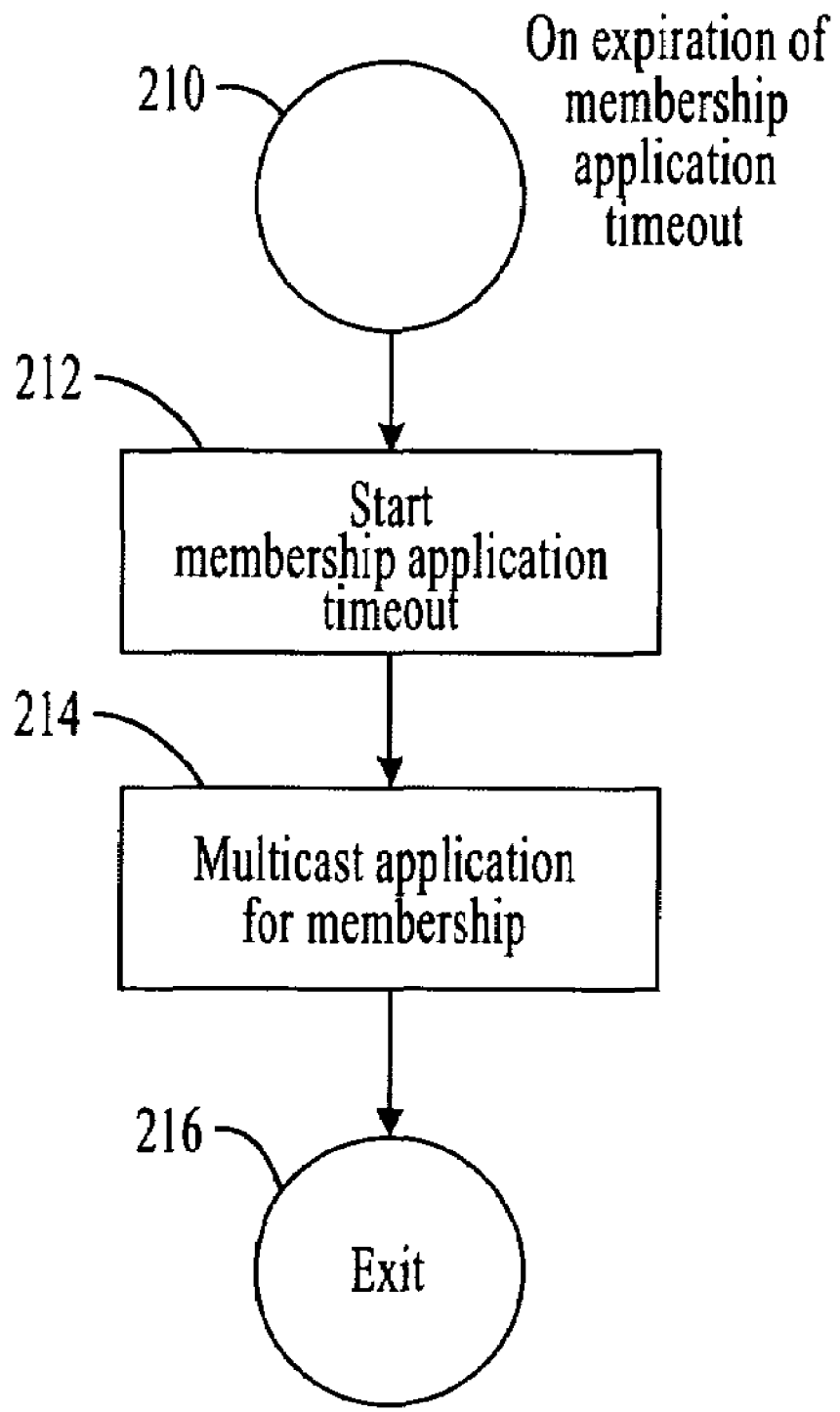
FIG. 9 is a flowchart of processing for an applicant according to an aspect of the present invention, shown when its membership application timeout expires.

FIG. 9 is a flow diagram that shows the actions of an applicant when a membership application timeout expires 210. The applicant starts the membership application timeout 212, multicasts the application for membership 214 and exits 216.

The following general steps are performed on expiration of membership application timeout:

start membership application timeout
  multicast application for membership

The above description includes example scenarios and flowcharts for an embodiment of the present invention to describe general operation of the present invention. It should be appreciated that the invention may be implemented with different programming by one of ordinary skill in the art, with the system capable of providing fault tolerance in a wide variety of circumstances (scenarios) without departing from the teachings of the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of maintaining consistent group membership for objects, wherein objects are distributed across a plurality of networked computers, said method comprising:
    classifying one member of a group as a Primary;
    classifying at least one other member of said group as a Backup;
    assigning a rank to each member of said group, with said Primary member having the lowest rank;
    assigning a unique precedence to each member of said group;
    based on rank of a Backup member, allowing a Backup member to claim status as the Primary member if said Backup member detects the failure of said Primary member;
    announcing the failure of said Primary member by said Backup member; and
    removing Backup members having a lower rank than said Backup member that has claimed status as said Primary member.

2. A method as recited in claim 1, further comprising communicating a message to other members of said group that said Backup member has claimed Primary status, wherein said message includes a new primary view number.

3. A method as recited in claim 2, wherein said primary view number is utilized in communications with other groups so that said other groups can detect a change in primary view number that can indicate that messages communicated under the prior primary view number were lost.

4. A method as recited in claim 1, wherein members removed from the group membership by said Backup member that has assumed the role of the new Primary member may subsequently reapply for membership.

5. A method as recited in claim 1, wherein said Primary member determines the addition of Backup members to the group, and the removal of Backup members from the group.

6. A method as recited in claim 1, further comprising the determination that the Primary member has failed when a lack of valid activity from said Primary member is detected.

7. A method as recited in claim 6, further comprising the determination that a lack of valid activity has occurred when a message has not been received from said Primary member within a fault detection timeout interval.

8. A method as recited in claim 1, wherein if more than one Backup member determines that said Primary member is faulty, the selection of which Backup member assumes the role of the new Primary member depends on said precedence.

9. A method as recited in claim 8, wherein assigning said precedence is performed in the order in which members are added to said group.

10. A method as recited in claim 9, wherein the rank of a member is determined by its precedence.

11. A method as recited in claim 1, wherein the members of said group maintain a consistent group membership view in response to membership changes without the need for a multiple-round consensus algorithm.

12. A method as recited in claim 1, wherein said Primary member of said group operates as the leader of said group while the remaining members operate as Backup members which follow said Primary member.

13. A method as recited in claim 1, wherein consistent group membership comprises maintaining agreement between all members of said group on the membership of said group and which is the Primary member of the group.

14. A method as recited in claim 1, wherein consistent group membership comprises ensuring that all members of said group have the same view of the membership set of said group and the identity of said Primary member.

15. A method as recited in claim 1, wherein a new membership of said group can be formed after faults in any number of said members, provided that at least one member remains as non-faulty.

16. A method as recited in claim 1, wherein said new membership of said group is formed in response to a single message multicast by the new Primary member.

17. A method as recited in claim 1, wherein one or more rounds of message exchanges between members of said group is not required to reach agreement on the membership of the group.

18. A method of maintaining consistent group membership for objects, wherein objects are distributed across a plurality of networked computers, said method comprising:
    classifying one member of a group as a Primary;
    classifying at least one other member of said group as a Backup;
    assigning a rank to each member of said group, with said Primary member having the lowest rank;
    assigning a unique precedence to each member of said group;
    based on rank of a Backup member, allowing a Backup member to claim status as the Primary member if said Backup member detects the failure of said Primary member; and
    announcing the failure of said Primary member by said Backup member;
    wherein the determination that the Primary member has failed when a lack of valid activity from said Primary member is detected;
    wherein the determination that a lack of valid activity has occurred when a message has not been received from said Primary member within a fault detection timeout interval; and
    wherein said fault detection timeout interval depends on said rank of said member.

19. A method of maintaining consistent group membership for objects, wherein objects are distributed across a plurality of networked computers, said method comprising:
    classifying one member of a group as a Primary;
    classifying at least one other member of said group as a Backup;
    assigning a rank to each member of said group, with said Primary member having the lowest rank;
    assigning a unique precedence to each member of said group;
    based on rank of a Backup member, allowing a Backup member to claim status as the Primary member if said Backup member detects the failure of said Primary member; and
    announcing the failure of said Primary member by said Backup member;
    wherein the determination that the Primary member has failed when a lack of valid activity from said Primary member is detected;
    wherein the determination that a lack of valid activity has occurred when a message has not been received from said Primary member within a fault detection timeout interval;

wherein a fault in the Primary member is detected by lower ranking Backup members having a shorter fault detection timeout interval than higher ranking Backup members; and wherein said fault may be detected by lower ranking Backup members earlier than higher ranking Backup members.

20. A method of maintaining consistent group membership for objects, wherein objects are distributed across a plurality of networked computers, said method comprising:

classifying one member of a group as a Primary;

classifying at least one other member of said group as a Backup;

assigning a rank to each member of said group, with said Primary member having the lowest rank;

assigning a unique precedence to each member of said group;

based on rank of a Backup member, allowing a Backup member to claim status as the Primary member if said Backup member detects the failure of said Primary member; and announcing the failure of said Primary member by said Backup member;

wherein the determination that the Primary member has failed when a lack of valid activity from said Primary member is detected;

wherein the determination that a lack of valid activity has occurred when a message has not been received from said Primary member within a fault detection timeout interval; and wherein said fault detection timeout interval for the Backup member of lowest rank is set to a time period within which said Primary member is expected to have performed actions.

21. A computer system, in which application objects are replicated by semi-active or passive replication across a plurality of networked computers to provide fault tolerance, said system comprising:

replication software executable on one or more networked computers in said system; and means associated with said replication software for maintaining a consistent membership view between a Primary member and Backup members, and wherein any of said Backup members can determine that the Primary member is faulty and can determine the new membership;

wherein replacement of a faulty Primary member and additional faulty Backup members is based on the ranks of the members, which determine the timeout periods necessary for detecting a fault.

22. A computer system as recited in claim 21, wherein said Primary member determines and communicates membership information to the other members of said group.

23. A computer system as recited in claim 21:

wherein a rank is assigned to each member of said group;

wherein the Backup member that first detects the failure of said Primary member asserts itself as the new Primary member and determines the group membership.

24. A computer system as recited in claim 23, wherein the timeout period for detecting the failure of a Primary member by a Backup member depends on the rank of said Backup member.

25. A computer system as recited in claim 24, further comprising assigning precedence values to the members of said group, wherein selection of said new Primary member is subject to said precedence when more than one Backup member detects that said Primary member is faulty.

26. A computer system as recited in claim 25, wherein said precedence is assigned to members of said group in response to the order in which members are added to said group.

27. A computer program having a computer readable medium with computer readable code stored thereon, said computer readable code executable on one or more computers in a system of networked computers wherein application objects are replicated by semi-active or passive replication across a plurality of networked computers for fault tolerance, said system comprising:

instructions for ranking members within a group of objects and communicating membership information from a Primary member to Backup members within a group of objects; and instructions for said Backup members to detect the failure of said Primary member and to claim to be the new Primary member;

wherein the time required for a Backup member to detect the failure of said Primary member is determined by the ranking of said Backup member.

28. A computer program as recited in claim 27, wherein the first Backup member that detects a failure of said Primary member asserts itself as the new Primary member to determine the group membership.

29. A computer program as recited in claim 28, wherein if more than one Backup member asserts itself as the new Primary member, then the precedence of the Backup member determines which Backup member will operate as the new Primary member.

30. A computer program as recited in claim 29, wherein said precedence is assigned to members of said group in response to the order in which members are added to said group.

31. A method of maintaining group membership based on the leader-follower strategy of Semi-Active or Passive replication, comprising the steps of:

monitoring the behavior of a Primary member of a group by other members of the group;

forming a new membership for the group by choosing a new Primary member for the group in response to said Primary member being detected as faulty by a Backup member;

wherein the membership set and the choice of said new Primary member is consistent across the members of the group;

wherein the determination of the membership set and the choice of said new Primary member avoids the need for a consensus decision; and wherein the determination of the membership set and the choice of said new Primary member avoids the overhead of the large number of messages that must be multicast in a consensus algorithm;

wherein the determination that said Primary member is faulty is based on the non-occurrence of events relating to said Primary member within the interval of a timeout; and wherein the duration of said timeout at a Backup member is determined by the rank of the Backup member.

32. A method as recited in claim 31, wherein a new membership can be formed after faults arise in any number of members, provided that at least one member is non-faulty.

33. A method as recited in claim 31, wherein a new membership is formed by a single message multicast by said new Primary member without any rounds of message exchange with other members of said group.

34. A method as recited in claim 31, wherein the members of said group are assigned precedences that are determined by the order in which the members are added to said group.

35. A method as recited in claim 34, wherein if two Backup members both claim to be the new Primary member, the Backup member having the higher precedence prevails and becomes the new Primary member.

36. A method as recited in claim 31:
wherein the members of said group are assigned ranks;
wherein said Primary member has the lowest rank and said Backup members have higher ranks.

37. A method as recited in claim 36, wherein the rank of a member is determined by its precedence.

38. A method as recited in claim 31, wherein a new membership can be formed after faults arise in any number of members, provided that at least one member is non-faulty.

39. A method as recited in claim 31, wherein each Backup member monitors the behavior of said Primary member and is able to assume the role of the Primary as a result of determining that said Primary member is faulty.

40. A method as recited in claim 31, wherein said non-occurrence of events comprises the reception of messages or acknowledgments from said Primary member.

41. A method as recited in claim 31, wherein the duration of said timeout for the Backup member of lowest rank is determined in response to the time within which said Primary member is expected to have performed actions.

42. A method as recited in claim 41, wherein the duration of the timeout, in each Backup member of higher rank, for said Primary member is determined by the time within which said Primary member is expected to have performed actions plus the time within which the Backup member of the next lower rank is expected to have detected the faulty behavior of said Primary member and to have assumed the role of the Primary.

43. A method of maintaining group membership based on the leader-follower strategy of Semi-Active or Passive replication, comprising the steps of:
monitoring the behavior of a Primary member of a group by other members of the group;
forming a new membership for the group by choosing a new Primary member for the group in response to said Primary member being detected as faulty by a Backup member;
wherein the membership set and the choice of said new Primary member is consistent across the members of the group;
wherein the determination of the membership set and the choice of said new Primary member avoids the need for a consensus decision; and
wherein the determination of the membership set and the choice of said new Primary member avoids the overhead of the large number of messages that must be multicast in a consensus algorithm; and
wherein a given Backup member, having determined that said Primary member is faulty, multicasts a message to the group members announcing that said Primary member is faulty, and that said Backup member is the new Primary member, and that all Backup members of lower ranks than said Backup member are to remove themselves from said group.

44. A method as recited in claim 43, wherein members that were previously removed from said group, as a consequence of a Backup member announcing that it has become the new Primary member, can reapply for membership in said group.

45. A method as recited in claim 44, wherein an applicant on admission to said group, is assigned a higher precedence than the precedences of all of the current or prior members of said group.

46. A method as recited in claim 45, wherein said message multicast to said group also announces a new primary view number.

47. A method as recited in claim 46, wherein every request, reply or other message carries the primary view number.

48. A method as recited in claim 47, wherein said primary view number is utilized by members of other groups in request, reply and other messages to become informed that there is a new Primary member of the group and that request, reply or other messages containing the prior primary view number might have been lost.

* * * * *